United States Patent
Thomson et al.

(10) Patent No.: US 8,689,277 B2
(45) Date of Patent: Apr. 1, 2014

(54) METHOD AND SYSTEM FOR PROVIDING LOCATION OF TARGET DEVICE USING STATELESS USER INFORMATION

(75) Inventors: Martin Wyville Thomson, Keiraville (AU); Anthony James Winterbottom, Gwynneville (AU)

(73) Assignee: Andrew LLC, Hickory, NC (US)

(*) Notice: Subject to any disclaimer, the term of this patent is extended or adjusted under 35 U.S.C. 154(b) by 294 days.

(21) Appl. No.: 12/892,283

(22) Filed: Sep. 28, 2010

(65) Prior Publication Data

US 2011/0173674 A1 Jul. 14, 2011

Related U.S. Application Data

(60) Provisional application No. 61/294,591, filed on Jan. 13, 2010, provisional application No. 61/315,478, filed on Mar. 19, 2010.

(51) Int. Cl.
*H04L 29/06* (2006.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| | | | |
|---|---|---|---|
| 6,097,709 A | 8/2000 | Kuwabara | |
| 6,108,558 A | 8/2000 | Vanderspool, II | |
| 6,115,605 A | 9/2000 | Siccardo et al. | |
| 6,115,754 A * | 9/2000 | Landgren | 709/249 |
| 6,269,246 B1 | 7/2001 | Rao et al. | |
| 6,281,834 B1 | 8/2001 | Stilp | |
| 6,393,294 B1 | 5/2002 | Perez-Breva et al. | |
| 6,449,486 B1 | 9/2002 | Rao | |
| 6,591,112 B1 | 7/2003 | Siccardo et al. | |
| 6,640,184 B1 | 10/2003 | Rabe | |
| 6,782,265 B2 | 8/2004 | Perez-Breva et al. | |
| 6,944,465 B2 | 9/2005 | Spain et al. | |
| 7,116,987 B2 | 10/2006 | Spain, Jr. et al. | |
| 7,167,714 B2 | 1/2007 | Dressler et al. | |
| 7,233,799 B2 | 6/2007 | Spain, Jr. | |
| 7,250,907 B2 | 7/2007 | Krumm et al. | |
| 7,257,414 B2 | 8/2007 | Spain, Jr. et al. | |
| 7,383,051 B2 | 6/2008 | Spain, Jr. et al. | |
| 7,433,652 B2 | 10/2008 | Durgin | |

(Continued)

OTHER PUBLICATIONS

J. Winterbottom et al., "Use of Device Identity in HTTP-Enabled Location Delivery (HELD) draft-ietf-geopriv-held-identity-extensions-04", http://tools.ietf.org/html/draft-ietf-geopriv-held-identity-extensions-04, pp. 1-29.

(Continued)

*Primary Examiner* — William Goodchild
(74) *Attorney, Agent, or Firm* — Volentine & Whitt, PLLC

(57) ABSTRACT

A method of providing a location of a target device to an application implementing a location based service includes receiving a request for a location of the target device from the application at a location server, the request including a location reference having a user reference referring to user information corresponding to the target device and stored in at least one data source. The method further includes retrieving the user information from the at least one data source using the user reference, determining the location of the target device based at least in part on the retrieved user information, and providing the determined location of the target device to the application.

20 Claims, 7 Drawing Sheets

(56) References Cited

U.S. PATENT DOCUMENTS

| | | | |
|---|---|---|---|
| 7,433,695 | B2 | 10/2008 | Gordon et al. |
| 7,460,505 | B2 | 12/2008 | Spain |
| 7,725,111 | B2 | 5/2010 | Dressler et al. |
| 7,734,298 | B2 | 6/2010 | Bhattacharya et al. |
| 7,753,278 | B2 | 7/2010 | Spain, Jr. et al. |
| 7,796,966 | B2 | 9/2010 | Bhattacharya et al. |
| 7,848,762 | B2 | 12/2010 | Gordon et al. |
| 7,899,467 | B2 | 3/2011 | Feuerstein et al. |
| 8,013,785 | B2 | 9/2011 | Bhattacharya et al. |
| 8,068,802 | B2 | 11/2011 | Bhattacharya et al. |
| 8,068,855 | B2 | 11/2011 | Dressler et al. |
| 8,106,817 | B2 | 1/2012 | Bhattacharya et al. |
| 8,106,818 | B2 | 1/2012 | Bhattacharya et al. |
| 8,155,394 | B2 | 4/2012 | Allegra et al. |
| 8,176,079 | B1 * | 5/2012 | Spertus .................. 707/785 |
| 2002/0004399 | A1 * | 1/2002 | McDonnell et al. .......... 455/456 |
| 2002/0035624 | A1 | 3/2002 | Kim |
| 2002/0126701 | A1 * | 9/2002 | Requena .................. 370/469 |
| 2003/0061515 | A1 | 3/2003 | Kindberg et al. |
| 2004/0082326 | A1 * | 4/2004 | Shaw et al. .............. 455/432.1 |
| 2004/0127229 | A1 | 7/2004 | Ishii |
| 2004/0203539 | A1 | 10/2004 | Benes et al. |
| 2004/0224664 | A1 | 11/2004 | Guo |
| 2004/0229632 | A1 | 11/2004 | Flynn et al. |
| 2005/0066044 | A1 * | 3/2005 | Chaskar et al. .............. 709/230 |
| 2006/0004924 | A1 | 1/2006 | Trossen |
| 2006/0015625 | A1 | 1/2006 | Ballinger et al. |
| 2006/0187832 | A1 | 8/2006 | Yu |
| 2007/0155401 | A1 | 7/2007 | Ward et al. |
| 2007/0155489 | A1 | 7/2007 | Beckley et al. |
| 2007/0287473 | A1 | 12/2007 | Dupray |
| 2008/0065775 | A1 | 3/2008 | Polk |
| 2010/0106774 | A1 | 4/2010 | Thomson et al. |
| 2010/0180039 | A1 | 7/2010 | Oh et al. |
| 2010/0235649 | A1 | 9/2010 | Jeffries et al. |
| 2010/0246567 | A1 | 9/2010 | Justusson et al. |
| 2010/0248740 | A1 | 9/2010 | Justusson et al. |
| 2010/0316006 | A1 | 12/2010 | Thomson et al. |

OTHER PUBLICATIONS

Co-pending U.S. Appl. No. 12/891,965, filed Sep. 28, 2010.
Co-pending U.S. Appl. No. 12/891,971, filed Sep. 28, 2010.
Rick Roberts, "Project: IEEE P802.15 Working Group for Wireless Personal Area Networks (WPANS)," Harris Corporation, Melbourne Florida, Oct. 4, 2004, pp. 1-11.
Stephanie Bell, A Beginners Guide to Uncertainty of Measurement, The National Physics Laboratory of the United Kingdom of Great Britain and Northern Ireland, Teddington, Middlesex, UK, 2001, pp. 1-41.
Non-Final Office Action dated Nov. 20, 2012 for U.S. Appl. No. 12/891,971.
Non-Office Action dated Feb. 24, 2012 for U.S. Appl. No. 12/891,965.
Final Office Action dated Aug. 2, 2012 for U.S. Appl. No. 12/891,965.
Final Office Action dated May 6, 2013 for U.S. Appl. No. 12/891,971.
OMA, "Mobile Location Protocol 3.2" Open Mobile Alliance, Candidate Version 3.2—Nov. 24, 2005, pges. 1-130.

* cited by examiner

METHOD AND SYSTEM FOR PROVIDING LOCATION OF TARGET DEVICE USING STATELESS USER INFORMATION

PRIORITY STATEMENT

This application claims priority from Provisional Patent Application No. 61/315,478, filed Mar. 19, 2010, and Provisional Patent Application No. 61/294,591, filed Jan. 13, 2010, in the United States Patent and Trademark Office, the disclosures of which are hereby incorporated by reference.

BACKGROUND AND SUMMARY

Conventional wireless communication services, as well as Internet Protocol services, may include the feature of determining geographic locations of devices. Whether the device is mobile or fixed in their network attachments, they are collectively referred to as "target devices." For example, one type of location based service is an E-911 emergency service responsive to "911" calls from target devices. Such emergency services may include estimating latitude and longitude of the target device, which is particularly important when a distressed caller is otherwise unable to provide their present position.

Locations of target devices may be determined by a location server, such as a location information server (LIS), operating in the corresponding network. A LIS may determine the location of a target device using positioning measurements from a global navigation satellite system (GNSS) provided by the target device, using terrestrial or network-oriented measurements (such as signal strength, arrival time, timing advance, wire map, etc.), or using a combination of techniques, for example. The location information may be retrieved from the LIS using network specific protocols, either directly or indirectly, e.g., through a location uniform resource identifier (URI) generated by the LIS. In IP networks, the LIS may determine the location of an IP terminal based on network topology, such as known locations of access points, for example. In a wired network, such as Ethernet or Digital Subscriber Line (DSL), a wiremap may be used for location determination based on tracing data through network access points to find the particular port to which the IP device is connected.

Generally, a location based service may be implemented by an application accessed over the Internet or other packet switching network, where the application requires "trustworthy" location information with respect to the target device. Conventional approaches to providing trustworthy location information over the Internet include "signing" the location information according to various methods that allow the location information to be attributed to a specific target device at a specific point in time. Currently, there is no standardization of such methods by the Internet community.

For example, a large enterprise, such as a university, government entity, corporation or the like, may provide a localized enterprise network, which is able to determine the location of target devices within the corresponding campus or facility to a relatively high degree of accuracy using an enterprise LIS. However, because it is an enterprise network, the location information provided by the LIS may not be inherently trusted by the Internet application requesting the location information. Conversely, a carrier may provide backhaul infrastructure to the enterprise over a carrier network, using a carrier LIS, which typically would be recognizable and trusted by the Internet application. However, the carrier network would be unable to provide location information indicating the position of the target device within the enterprise network, or would otherwise be unable to provide location information to the same degree of accuracy. For example, an enterprise network may be able to provide locations with reference to specific buildings located on a campus and/or floors within a building.

Location URIs may be created that do not require state to be maintained by the enterprise LIS and/or the carrier LIS, as described for example in U.S. patent application Ser. Nos. 12/891,965 and 12/891,971, filed Sep. 28, 2010, which are hereby incorporated by reference. Generally, the stateless location URI includes a compact representation of state data, necessary to serve a request to the location URI, enabling a LIS to retrieve necessary state from the location URI. Encryption may be used to protect the location information about the target device.

However, possession of a stateless location URI may immediately grant access to the location and other information about the target device, which is known as "authorization by possession." This is typically undesirable, particularly where dissemination of the location URI is not or can not be controlled. An alternative authorization model, known as "authorization by access control," has the LIS consult an authorization policy before serving requests to the location URI. Typically, requesters have to prove other facts, such as identity, before location information is granted to them. An authorization policy provides the ability to set conditions on the grant of location information. The location URI created by this process is served by the LIS using its own capabilities. The capabilities of the target device are often useful in gaining more accurate location. Use of device capabilities and how they are invoked can be negotiated prior to the creation of the location URI.

However, the authorization policy and device capabilities are additional state required to serve a request to the location URI. The size and complexity of authorization policies and device capabilities could exceed the space allowed for including information in the location URI itself, as well as for encrypting.

In a representative embodiment, a method provides a location of a target device to an application implementing a location based service. The method includes receiving a request for a location of the target device from the application at a location server, the request including a location reference including a user reference referring to user information corresponding to the target device and stored in at least one data source; retrieving the user information from the at least one data source using the user reference; determining the location of the target device based at least in part on the retrieved user information; and providing the determined location of the target device to the application.

In another representative embodiment, a system for providing a location of a target device to an application implementing a location based service includes a location server and a data source. The a location server is configured to receive a request for a location of the target device from the application, the request including a location reference including a user reference referring to user information corresponding to the target device. The data source is configured to store the user information. The location server retrieves the user information from the data source using the user reference, determines the location of the target device based at least in part on the retrieved user information, and provides the determined location of the target device to the application.

In another representative embodiment, a method provides a location of a target device. The method includes receiving a first location URI request from the target device at a first LIS and generating a first location URI in response to the first request, where the first location URI includes device identification information identifying the target device and a user reference referring to user information corresponding to the target device and stored in at least one data source. The first location URI is included in a second location URI request to a second LIS, the second LIS generating a stateless second location URI in response to the second request, the first location URI being embedded in the second location URI. The method further includes receiving the second location URI from the second LIS; providing the second location URI to the target device to be provided to an application requesting location information of the target device from the second LIS; receiving a query from the second LIS requesting the location of the target device, the query including the first location URI; identifying the target device using the device identification information in the first location URI; retrieving the user information from the at least one data source using the user reference in the first location URI; determining the location of the target device based at least in part on the retrieved user information; and providing the determined location of the target device to the second LIS, which provides the determined location to the application.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

In various embodiments, implementation of a location reference, such as a location URI, requires minimal maintenance of state on a location server when changeable user information is applied to the location reference. The user information includes data associated with the target device and operation thereof, such as associated authorization policies and device capabilities. The stateless or minimal state implementation of the location reference prevents data, including the user information and location information for the target device, from being obtained or altered. Once created using the stateless process, the location reference is immutable. If policy and device capability information are encrypted into the location reference, the values cannot be changed or re-negotiated. For authorization policies, in particular, changing policy is an important feature that is used to protect user privacy.

Also, in various embodiments, trusted location information regarding the geodetic or civic position of the target device may be provided to a location server based service application across trust domains, transparently to already standardized mechanisms. A location reference may be generated or obtained by an enterprise location server and used to instantiate carrier trustworthiness to the location information determined by the enterprise location server, e.g., using established methods of location information transfer.

Figure 1:
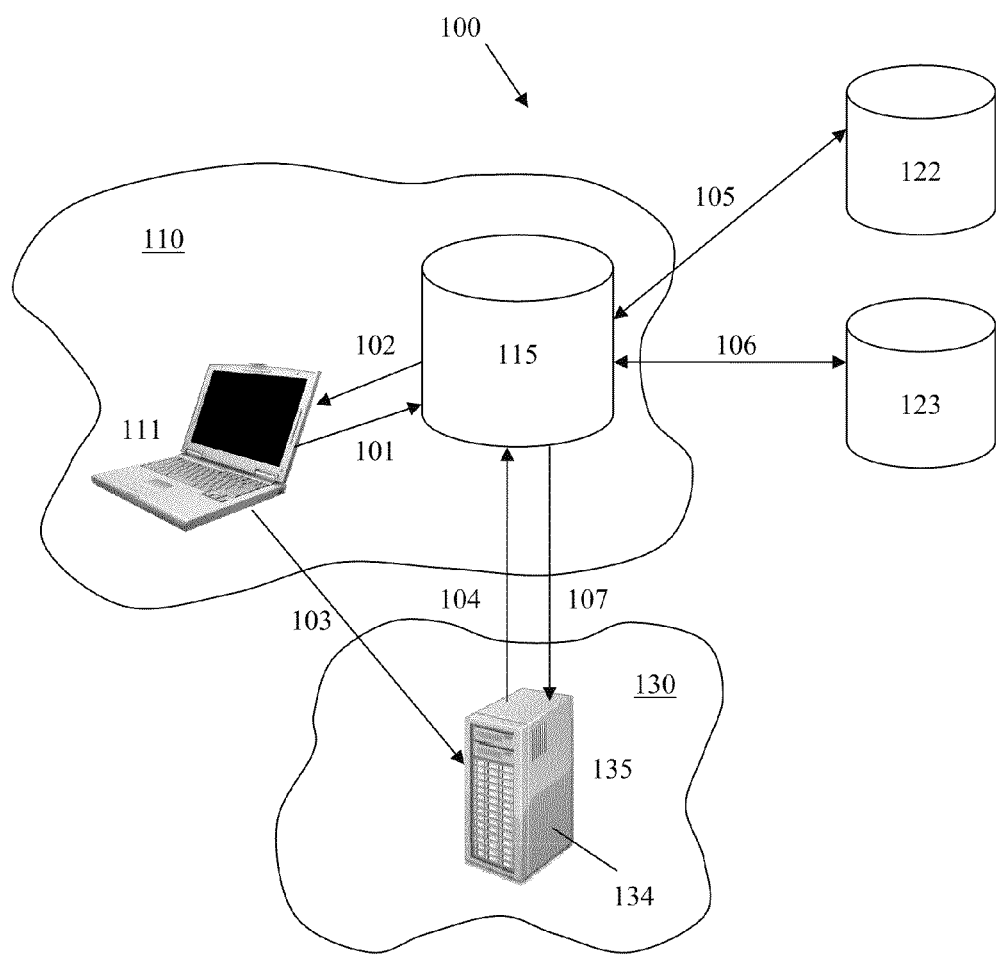
FIG. 1 is a functional block diagram illustrating a system for locating target devices in a communication network using stateless or minimal state user information, according to a representative embodiment.

FIG. 1 is a functional block diagram illustrating a system for locating target devices in a communication network using stateless or minimal state user information, according to a representative embodiment.

Referring to FIG. 1, telecommunications system 100 includes network 110 serviced by location server 115. Representative target device 111 is shown residing in the network 110. The target device 111 may be any type of device or terminal, configured for communicating through the telecommunications system 100, such as a cellular phone, a VoIP phone, a laptop computer, a personal digital assistant (PDA), a gaming device, television, appliance (e.g., refrigerator), or the like.

The network 110 includes location server 115, which is configured to communicate with one or more user information data sources, such as databases and/or database servers, indicated by representative authorization policy server 122 and device capability server 123. The authorization policy server 122 and device capability server 123 are depicted as external database servers, although it is understood that they alternatively may be internal databases, without departing from the scope of the present teachings. The data sources may be selected by the location server 115 or by the target device 111. The location server 115 may communicate with the authorization policy server 122 and device capability server 123 using any network and/or communication techniques.

The target device 111 is depicted accessing a location based service, provided by application 134 running on application server 135 in network 130. For example, the network 130 may be the Internet, in which case the application server 135 may be a web server accessible by the target device 111 through any of a variety of wired or wireless modems and/or access points, as would be apparent to one of ordinary skill in the art. In various embodiments, the network 130 may include other types of communication networks, such as Ethernet or private corporate network, without departing from the scope of the present teachings.

The location server 115 is configured to implement any of various types of location determination algorithms or processes for determining locations of target devices, such as the target device 111, operating within the network 110. Examples of location determination processes may use satellite and/or terrestrial positioning systems to determine the location of the target device 111 based on satellite measurements, terrestrial measurements or combinations thereof for position calculation, which may include trilateration techniques. Satellite positioning systems, such as GNSS networks, may be any system configured to provide geographic locations of receivers, e.g., housed in the target device 111, using a constellation of satellites, such as the Global Positioning System (GPS), Global Navigation Satellite System (GLONASS), Galileo and COMPASS Navigation Satellite System (BeiDou), and the like. Terrestrial positioning systems may be based on any type of range measurements, such as round-trip time (RTT) measurements (e.g., in a UMTS network), uplink-time difference of arrival (U-TDOA) or timing advance (TA) measurements (e.g., in a GSM network), enhanced observed time difference (E-OTD) measurements, angle of arrival (AoA) measurements, power of arrival (POA) measurements, WiFi measurements, DTV signals, wiremap and packet tracing techniques, and the like. Of course, the method(s) which the location server 115 is configured to use for determining the location of the target device 111 may vary to provide unique benefits for any particular situation or to meet application specific design requirements of various implementations, as would be apparent to one of ordinary skill in the art.

In addition, the location determination processes implemented by the location server 115 may include using access points, sensors or the like, located throughout the facility serviced by the network 110. For example, the target device 111 may connect with resources of the first network 110, including the location server 115, through a wired or wireless local area network (LAN), such as WiFi (IEEE standard 802.11) or WiMax (IEEE standard 802.16) networks, for example. The location of the target device 111 may then be determined, in part, based on a previously stored location of an access point used by the target device 111. Where the access point is wireless in nature, more precise locations within the first network 110 may be attained using sensors, signal strength measurements, triangulation among different access points and various other techniques, as would be apparent to one of ordinary skill in the art.

However, it is understood that the infrastructure and techniques for communication between the target device 111 and the location server 115 may vary without departing from the scope of the present teachings. For example, the network 110 may include one or more IP routers configured to interface with the first location server 115. Further, the IP router may be configured to communicate with the application server 135 via one or more additional IP routers in the third network 130 and/or in a gateway and circuit switching network, for example.

In the depicted embodiment, the target device 111, while residing in the network 110, requests a location reference from the location server 115 in step 101. The request may be in response to execution of a location based service by the target device 111. Alternatively, the target device 111 may initiate such a request generally, e.g., whenever connecting to the network 110 or after being connected over a predetermined period of time, in anticipation of the possibility of needing this information. Also, the request for the location reference for the target device 111 may be initiated by a client other than the target device 111.

In response to the request, the location server 115 generates a location reference, such as a location URI. The location reference includes embedded device identification information enabling the location server 115 subsequently to identify the target device 111, e.g., when the application 134 resolves the location reference with the location server 115 in step 104, discussed below. For example, the device identification information may include an electronic serial number (ESN), an IP address, a Media Access Control (MAC) address or other unique identifier associated with the target device 111.

The location reference also includes one or more embedded user references associated with the target device 111. Each user reference identifies or references user information stored in one or more data sources. In various embodiments, the user reference may be a URI, for example. The stored user information may include changes or updates (referred to as "revisions") to previous user information or basic user information, including the most recent revisions to the user information, for example, made since creation of the location reference. The user information provides various details about the user's account or subscription, such as policy information, and about the target device 111 itself, such as device capability information. The policy information may include policy data, validating date, and the like, for example. Policy data indicates how and to whom the location information for the target device 111 may be provided, e.g., based on location context, expiry times and other policy considerations, and validating data ensures that identification and other information needed to initiate a location determination process apply to the target device 111, for example. The device capability information may include an indication that the device is capable of acquiring and reporting measurements of GNSS signals or other types of measurements, or that it is capable of determining its own location independently, for example. In the depicted embodiment, the policy information is stored in authorization policy server 122 and the device capability information is stored in device capability server 123, for example.

In various embodiments, the location reference (e.g., location URI) may further include embedded basic user information in addition to the user reference. The basic user information then may be supplemented by the user information obtained using the user reference, as discussed in more detail below. The location reference may also include an expiration time and additional state information, for example. All or part of the embedded user reference(s), basic user information and/or the device identification information may be encrypted using a predetermined encryption technique and key, known by at least the location server 115.

In order to provide the location reference, the location server 115 identifies the relevant user information and/or corresponding data sources in various ways, without departing from the scope of the present teachings, in order to insert the appropriate user reference and/or basic user information in the location reference. For example, the location reference request from the target device 111 may specifically identify the authorization policy server 122 and the device capability server 123, as well as corresponding addresses, as the data sources containing the policy information and device capability information, respectively. Alternatively, the location server 115 may maintain a list, look-up table or the like associating various target devices, including the target device 111, with respective data sources and addresses containing user information. The location server 115 may access the list or look-up table using the unique identifier associated with the target device 111, for example. Alternatively, the location server 115 may create the user information, e.g., with default contents, and the user and/or provider may be given the ability to change the user information.

As mentioned above, in an embodiment, the location reference includes all or part of the user information as embedded basic user information in addition to the user references that reference the user information stored in one or more data sources, where the stored user information provides a the remainder of the user information, a complete set of the user information and/or revisions to the user information. For example, a predetermined portion of the location reference may include basic policy information and device capability information associated with the target device 111. In addition, the predetermined portion of the location reference may also include a policy user reference that refers to complete and/or more recent policy information and a device capability user reference that refers to complete and/or more recent device capability information, which supplement the basic policy information and/or device capability information. The policy information and the device capability information are stored in the authorization policy server 122 and the device capability server 123, respectively, which are identified by the policy user reference and the device capability user reverence. For example, the authorization policy server 122 and the device capability server 123 may store complete sets of policy information and device capability information, respectively. This may be necessary when the complete sets of user information exceed the predefined limits for storing information in the location resource itself. In effect, this implementation is not necessarily stateless with respect to these items.

The user references may identify data sources, such as the authorization policy server 122 and the device capability server 123, by providing complete identifiers, such as IP addresses, MAC addresses, uniform resource locators (URLs) or other unique identifiers associated with the data sources. Alternatively, the user references may identify the data sources using abbreviated or short identifiers. For example, the location server 115 may maintain a list or look-up table of data source potentially having user information and substitute a short identifier for each data source, e.g., including the authorization policy server 122 and the device capability server 123. Accordingly, the location reference request may simply include the short identifiers corresponding to the authorization policy server 122 and the device capability server 123 in order to conserve space in the location resource, yet still enable the location server 115 to obtain the full identification of the respective data sources. Similarly, the location server 115 may maintain a list or look-up table of servers (e.g., using short identifiers) corresponding to target devices, such as the target device 111. Accordingly, the location server 115 is able to identify the authorization policy server 122 and the device capability server 123 using only the unique identifier associated with the target device 111, in which case user references are not needed in the location resource.

In another embodiment, the user reference refers to one or more documents that include only limited portions of the user information, such as the policy information and the device capability information, respectively. For example, the documents may be extensible markup language (XML) formatted documents and may include only revisions to the policy information and the device capability information, if any, implemented after the location reference is created at the request of the target device 111. The documents may be created, updated and stored by the authorization policy server 122 and the device capability server 123, respectively. If a document identified by a user reference is not present on the respective data source, it may be assumed that no changes have been made to the user information, and thus the basic user information included in the location reference, a default set of user information and/or the user information referenced by the location reference is used. That is, the documents are created only when the policy information and/or the device capability information associated with the target device 111, for example, have been revised. This allows the location reference to be served with minimum additional state, while still allowing for the revisions. The choice of default user information may be made based on prior knowledge of the user information in such a way that minimizes the probability that revisions are needed.

Compression on the user reference may be necessary. For example, the user reference may be a URI, a URL or other type of identifier, which is relatively long. Depending on deployment characteristics, information redundancy may be removed from the user reference. For instance, when a document is stored on a remote server, such as the authorization policy server 122 and the device capability server 123, the location reference may simply include a short identifier for each of the authorization policy server 122 and the device capability server 123, as discussed above. The location server 115 is thus able to identify the authorization policy server 122 and the device capability server 123 by referencing the potential server list or look-up table. In other implementations, where the location server 115 uses a standard location for policy and capability information, the same proprietary identifier may be used for both.

The location server 115 generates the location reference, including the user reference(s) and the device identification information (and possibly all or a portion of the user information, depending on the implementation) associated with the target device 111, and returns the location reference to the target device 111 in step 102. After receiving the location reference from the first location server 115, the target device 111 conveys the location reference to the application server 135 in step 103, e.g., in reply to a request for the location reference by the application 134. Alternatively, the target device 111 may automatically provide the location reference to the application 134 upon initiating the corresponding location based service. The application 134 may be any location based service implemented by the application 134, without departing from the scope of the present application. For example, the application 134 may be configured to provide directions or to identify the nearest locations of various restaurants, gas stations, rest stops or the like.

In step 104, the application 134 requests the location of the target device 111 from the location server 115 using the location reference provided by the target device 111, assuming the location server 115 is a trusted server. In alternative embodiments, in which the application 134 does not regard location server 115 as a trusted server, the location server 115 may be accessed through a trusted location server, which works in tandem with the location sever 115, as discussed below with reference to FIG. 4.

In response to the request from the application 134, the location server 115 decrypts the location reference, if necessary, including the predetermined portion of the location reference containing the user references for accessing all or a portion of the user information (and possibly all or a portion of the user information, depending on the implementation). The location server 115 uses the user references to obtain the user information and/or to revise or supplement basic user information included in the location reference. The location server 115 retrieves a complete and/or revised set of policy information from the policy server 122 in step 105 and retrieves a complete and/or revised set of device capability information from the device capability server 123 in step 106.

Alternatively, when the authorization policy server 122 stores a policy revision document that only includes revisions to the policy information since creation of the location reference, as discussed above, the location server 115 retrieves only the policy revision document or an indication that the policy revision document does not exist (e.g., when no updates to the policy information have been made). Similarly, when the device capability server 123 stores a capability revision document that only includes revisions to the device capability information since creation of the location reference, the location server 115 retrieves only the capability revision document or an indication that the capability revision document does not exist (e.g., when no updates to the device capability information have been made).

The location server 115 also extracts the device identification information from the location reference to identify the target device 111, e.g., from among multiple mobile devices operating within the network 110. The location server 115 then determines the location of the identified target device 111 by performing a location determination algorithm, discussed above, using the various policy and device capability information retrieved from the authorization policy server 122 and device capability server 123, respectively. For example, the location server 115 may confirm that the application 134 is permitted to retrieve the location of the target device 111 using the policy information, and may select a particular location determination algorithm based on the device capability information. For example, the location server 115 may employ a location determination algorithm that relies on input from the target device 111, when the device capability information indicates the ability of the target device 111 to support that location determination algorithm. For instance, the location sever 115 may attempt the GNSS algorithm to calculate location when device capability information indicates that the target device 111 has a GNSS receiver. The location of the target device 111 determined by the location server 115 is provided to the application server 135 in step 107, which uses the determined location to complete execution of the application 134.

Figure 2:
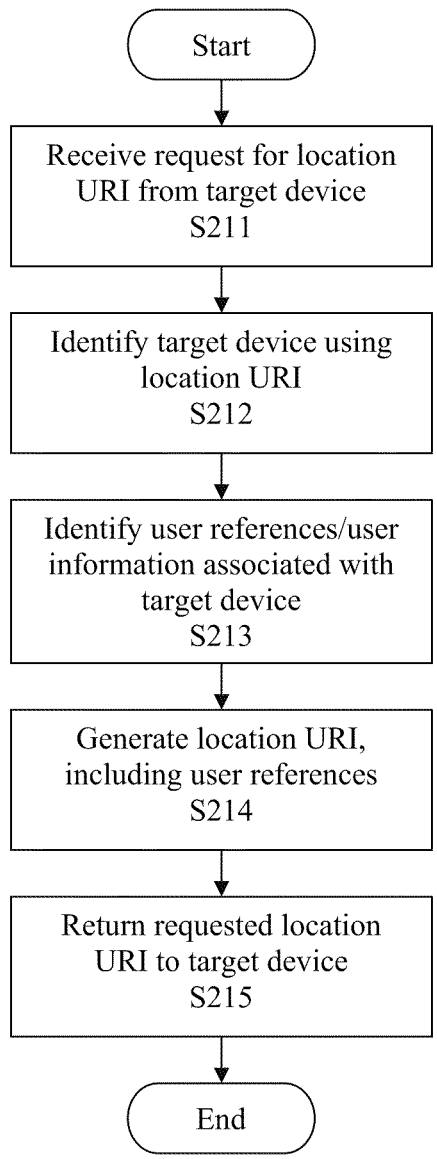
FIG. 2 is a flowchart illustrating a method implemented by a location server for locating target devices using stateless or minimal state user information, according to a representative embodiment.
Figure 3:
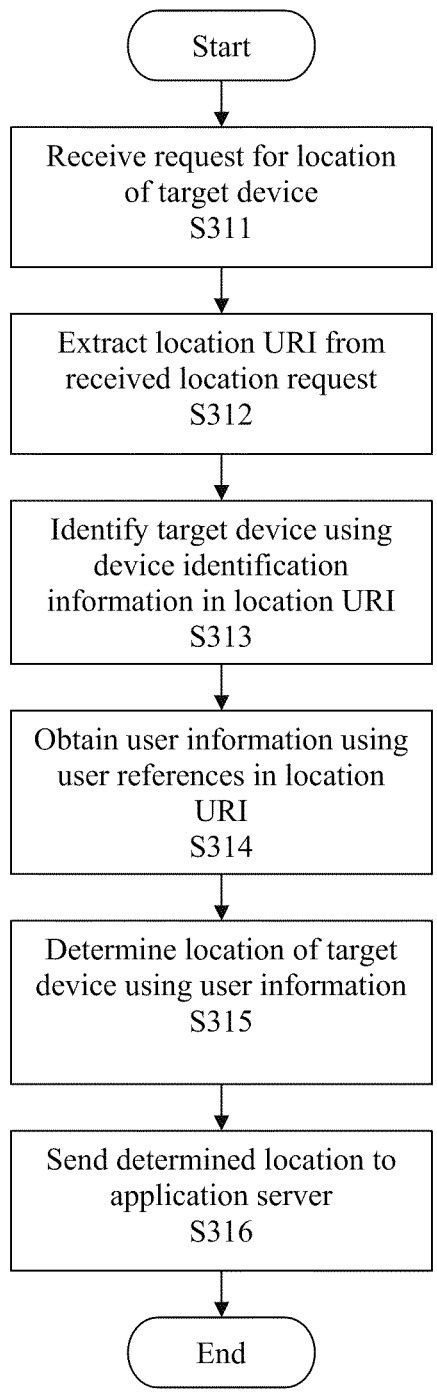
FIG. 3 is a flowchart illustrating a method implemented by a location server for locating target devices using stateless or minimal state user information, according to a representative embodiment.

The location determination process using user references discussed above with reference to FIG. 1 may be implemented according to complementary algorithms executable by the location server 115. For example, FIG. 2 is a flowchart illustrating a method implemented by the location server 115 for providing a location reference to the target device 111, and FIG. 3 is a flowchart illustrating a method implemented by the location server 115 for providing the location of the target device 111 to the application server 135, according to representative embodiments. For purposes of description, the location reference is assumed to be a location URI, although various other types of location reference may be incorporated, as discussed above.

Referring to FIG. 2, the location server 115, e.g., a LIS, receives a request for a location URI from the target device 111 in block S211, where the target device 111 is operating within the network 110. The target device 111 has a MAC address and has been allocated a dynamic IP address in the network 110. The request is received through the network 110, which may be any type of wired or wireless IP network in the present example.

In response, the location server 115 identifies the target device 111 in block S212 using device identification information included in the request for the location URI, such as an ESN, an IP address, a MAC address or the like. For example, the location server 115 may identify the IP address of the target device 111 from the request received in block S211, and determine the MAC address of the target device 111 based on the IP address using any of a variety of determination techniques, as would be apparent to one of ordinary skill in the art. In an embodiment, the location server 115 may then create a unique token, which it uses as a key in its memory cache to point to the IP address and the MAC address of the target device 111. Of course, various alternative techniques for identifying the target device 111 may be incorporated without departing from the scope of the present teachings.

In block S213, the location server 115 identifies the user references associated with the target device 111, as well as user information and/or data sources, such as the authorization policy server 122 and the device capability server 123, which contain all or a portion of the user information and to which the user references refer. As discussed above, the location server 115 may identify the data sources based on information extracted from the location URI request received from the target device 111. For example, the network 110 may have an associated predetermined configuration (e.g., different from other networks served by the location server 115), which includes the identity of the authorization policy server 122 and the device capability server 123. If the location server 115 serves multiple networks, the network 110 may be identified using the IP address of the target device 111. Alternatively, the authorization policy server 122 and the device capability server 123 may be identified based on the network interface on which the request originates, the location of the target device 111 or any other available information, without departing from the scope of the present teachings.

The location server 115 generates or otherwise obtains the requested location URI in block S214. As discussed above, the location URI includes parameters that enable subsequent identification of the target device 111, as well as the user references that refer to complete and/or revised sets of user information or to documents indicating revisions to the user information. As discussed above, the location URI may also include basis basic user information in addition to the user references. For example, the location URI may include an encrypted portion having basic policy information and basic device capability information, and a policy reference that refers to a document stored in authorization policy server 122 containing at least one revision to the policy information, and a device capability reference that refers to a document stored in authorization policy server 122 containing at least one revision to the device capability information. The location URI is returned to the target device 111 in block S215. As discussed above, the target device 111 forwards the location URI to the application server 135 pursuant to execution of a location based service, and the application 134 resolves the location URI by presenting it to the location server 115.

Referring now to FIG. 3, the location server 115 eventually receives a request for the location of the target device 111 from the application server 135 in block S311. The request may be received by the location server 115 via the Internet 130 or other communication network, such as dedicated trunks, VPN connections and the like, for example. The request includes the location URI generated by the location server 115 and provided to the target device 111 in block S215 of FIG. 2. The location server 115 extracts the location URI from received location request in block S312.

In block S313, the location server 115 identifies the target device 111 using device identification information in the extracted location URI. For example, when the location URI includes a unique token created by the location server 115, as discussed above, the location request from the application server 135 includes the unique token. The location server 115 is then able to consult its memory cache using the unique token as a key to determine the IP address and MAC address of the target device 111.

In addition, the location server 115 obtains user information corresponding to the target device 111 in block S314 using the one or more user references in the extracted location URI that refer to associated data sources, such as the authorization policy server 122 and the device capability server 123. In various embodiments, the user references may identify or refer to user information stored in the data sources, which may include complete sets of the most recent user information and/or documents indicating only revisions to the user information, as discussed above. For example, if the location URI already includes basic policy information and basic device capability information, the location server 115 will supplement and/or update this basic user information using either the complete sets of policy information and device capability information retrieved from the authorization policy server 122 and the device capability server 123, respectively, or using the revisions indicated by the documents retrieved from the authorization policy server 122 and the device capability server 123, respectively. If the location URI does not include any policy information or device capability information, the location server 115 will retrieve the complete sets of policy information and device capability information from the authorization policy server 122 and the device capability server 123, respectively, using the corresponding user references.

In block S315, the location server 115 determines the location of the target device using the obtained user information. For example, the location server 115 confirms that the user device 111 is authorized to participate in location based services and that the application 134 is permitted to obtain the location of the target device 111. The location server 115 then selects a location determination algorithm based, at least in part, on the capabilities of the target device 111. For example, if the device capability information indicates that the target device 111 includes a GNSS receiver, then the location server 115 will calculate the location of the target device 111 using a GNSS algorithm. The calculated location of the target device 111 is returned to the application server 135 in block S316, enabling the application 134 to proceed with execution of the corresponding location service.

Although FIGS. 1-3 are directed to implementations including a single location server, in various embodiments, the trusted location information regarding the geodetic or civic position of a target device is provided to a location based service application across trust domains, transparently to already standardized mechanisms. For example, a location reference, such as a location URI, is generated or obtained by an enterprise location server and used to instantiate carrier trustworthiness to the location information determined by the enterprise location server, e.g., using established methods of location information transfer, where the user information may be available to one or both the enterprise location server and a carrier location server.

Figure 4:
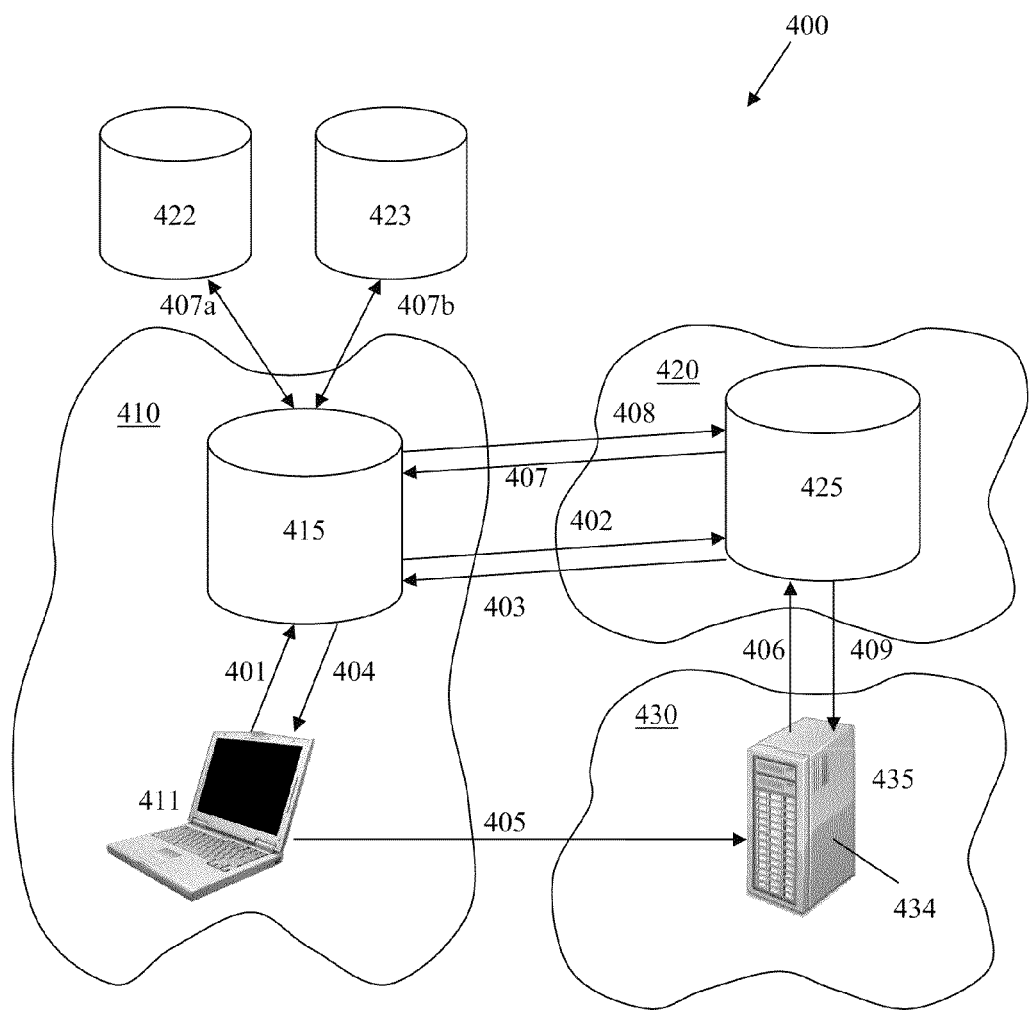
FIG. 4 is a functional block diagram illustrating a tandem location server system for locating target devices in a communication network using stateless or minimal state user information, according to a representative embodiment.

FIG. 4 is a functional block diagram illustrating a tandem location server system for locating target devices in a communication network using stateless or minimal state user information, according to a representative embodiment.

Referring to FIG. 4, telecommunications system 400 includes multiple networks serviced by corresponding location servers, indicated by first network 410 serviced by first location server 415 and second network 420 serviced by second location server 425. Representative target device 411 is shown residing in the first network 410. The target device 411 may be any type of device or terminal, configured for communicating through the telecommunications system 400, such as a cellular phone, a VoIP phone, a laptop computer, a PDA, a gaming device, television, appliance, or the like.

In the depicted embodiment, the first network 410 may be an enterprise network, for example, corresponding to a particular facility, such as a campus, a multiple story building or the like. The first network 410 includes location server 415, which may be referred to as an "asserting LIS," for example. The second network 420 may be a carrier network, for example, corresponding to a wide area network (WAN) or the like. The second network 420 includes the second location server 425, which may be referred to as a "validating LIS," for example.

Each of the first and second location servers 415 and 425 are configured to implement any of various types of location determination algorithms or processes, without departing from the scope of the present teachings, for determining locations of target devices, such as target device 411, operating within one or both networks. Examples of location determination processes may use satellite and/or terrestrial positioning systems, as discussed above with reference to location server 115. Of course, the method(s) which the first and second location servers 415 and 425 are configured to use for determining the location of the target device 411 may vary to provide unique benefits for any particular situation or to meet application specific design requirements of various implementations, as would be apparent to one of ordinary skill in the art.

In addition, due to the localized nature of the first network 410, the location determination processes implemented by the first location server 415 may include using access points, sensors or the like, located throughout the facility serviced by the first network 410. For example, the target device 411 may connect with resources of the first network 410, including the first location server 415, through a wired or wireless LAN, such as WiFi or WiMax networks, for example. The location of the target device 411 may then be determined, in part, based on a previously stored location of an access point used by the target device 411. Where the access point is wireless in nature, more precise locations within the first network 410 may be attained using sensors, signal strength measurements, triangulation among different access points and various other techniques, as would be apparent to one of ordinary skill in the art. Thus, location determination by the first location server 415 in response to a location request from the target device 411 may be particularly accurate, e.g., as compared to the second location server 425, which may only be able to provide accuracy to the level of the complete coverage area of first network 410.

However, it is understood that the infrastructure and techniques for communication between the target device 411 and the first location server 415 and/or the second location server 425 may vary without departing from the scope of the present teachings. For example, the first network 410 (and/or the second network 420) may include one or more IP routers configured to interface with the first location server 415. Further, the IP router may be configured to communicate with the application server 435 via one or more additional IP routers in the third network 430 and/or in a gateway and circuit switching network, for example.

For purposes of discussion, it is assumed that the first network 410 implements location services that are not trusted by an external application, such as representative application 434 running on application sever 435, while the second network 420 implements location services that are trusted by the application 434. In other words, there is no preexisting trust relationship between the application 434 and the first location server 415, but there is a preexisting trust relationship between the application 434 and the second location server 425. For example, the application server 435 may be a public safety access point (PSAP) associated with an emergency call center for answering calls to emergency numbers, including 911. Thus, the application 434 automatically initiates a location determination process in response to a call from the target device 411 by querying the (trusted) second location server 425, even though the target device 411 is in the first network 410 serviced by the (untrusted) first location server 415. This serving network arrangement is not visible to the application 434, as the location URI provided by target 411 denotes that the second location server 425 is to be used for acquiring the location of target 411.

According to various embodiments, the telecommunications system 400 provides a tandem trust relationship between the application server 435 and the first location server 415 through location server 425, which need not maintain state with respect to the relationship, so that the application server 435 may obtain location information with respect to the target device 411, even though location information provided directly by the location server 415 would otherwise be deemed untrustworthy. Various steps for establishing the tandem trust relationship in a stateless implementation, and providing location information to the application server 435 are depicted in FIG. 4 by numbered arrows, according to a representative embodiment.

In various embodiments, location references may be served by the first and second location servers 415 and 425 (e.g., asserting LIS and validating LIS) in a stateless fashion. This is accomplished by placing all of the information necessary to serve a request for the location of the target device 411 in the location reference itself, such that a trusted location server (e.g., the second location server 425) is able to identify and communicate with an untrusted location server (e.g., the first location server 415) servicing the network 410 in which the target device 411 is located. Examples of creating location references that include embedded location context information and handling location requests using such location requests are provided by U.S. patent application Ser. No. 12/411,883 and U.S. patent application Ser. No. 12/411,928, filed in the United States Patent and Trademark Office on Mar. 26, 2009, which are hereby incorporated by reference.

In the depicted embodiment, the target device 411, while residing in the first network 410, requests a location reference from the first location server 415 in step 401. The request may be in response to execution of a location based service by the target device 411. Alternatively, the target device 411 may initiate such a request generally, e.g., whenever connecting to the first network 410 or after being connected over a predetermined period of time, in anticipation of the possibility of needing this information. Alternatively, the request for the location reference for the target device 411 may be initiated by a client other than the target device 411.

In accordance with various embodiments, the location reference includes at least the following three properties. First, the external domain to which the location reference is attributed is that of the second location server 425, which may be the carrier's or the infrastructure provider's LIS, as discussed above. That is, the location reference points to the second location server 425. Second, the location reference includes one or more parameters that enable the second location server 425 to identify the first location server 415.

For example, in the depicted illustrative embodiment, the first location server 415 generates a first location reference in response to the location reference request in step 401, and makes a request of the second location server 425 in step 402, including the first location reference. The first location reference may be a first location URI, for example. The first location reference may also be stateless. The first location reference includes embedded information that enables the first location server 415 subsequently to identify the target device 411, e.g., when the first location server 415 receives the first location reference from the second location server 425, as discussed below with reference to step 407. For example, the device identification information may include an ESN, an IP address, a MAC address or other unique identifier associated with the target device 411. In an embodiment, all or part of the embedded device identification information is encrypted using a predetermined encryption technique and key, known by at least the first and/or second location servers 415, 425.

Also, as discussed above with respect to the location reference provided by location server 115, the first location reference provided by the first location server 415 includes user references associated with the target device 411. Each user reference identifies or refers to user information stored in one or more data sources, which may include revisions to the user information, thus providing additional context information. For example, the location reference may include embedded basic user information associated with the target device 411 and user references that identify or refer to user information in one or more data sources, such as representative authorization policy server 422 for storing policy information and device capability server 423 for storing device capability information. In addition, the location reference (or the policy information) may include an expiration time and additional state information, for example, without departing from the scope of the present teachings. All or part of the embedded device identification information, user reference(s) and/or user information may be encrypted using a predetermined encryption technique and key, known by at least the first location server 415.

The location server 415 may identify the relevant user reference(s), user information and/or corresponding data sources in various ways, without departing from the scope of the present teachings, as discussed above with respect to the location server 115. Also, in various embodiments, the location reference may include basic user information, plus user references identifying or referring to user information in one or more data sources containing the remainder of the user information and/or revisions to the basic user information. Alternatively, the user information referred to by the location reference may include one or more documents containing only revisions, if any, in the basic user information, e.g., implemented after the location reference is created at the request of the target device 411. The user information (including the documents, if any) may be stored on and updated by the authorization policy server 422 and the device capability server 423, for example. The functionality of the authorization policy server 422 and the device capability server 423, as well as the configuration of the user information and the documents containing updates to the user information, are substantially the same as discussed above with reference to the authorization policy server 122 and the device capability server 123 in FIG. 1, and therefore the descriptions will not be repeated.

In response to the request from the first location server 415 in step 402, the second location server 425 generates a second location reference, which includes or otherwise refers to the first location reference provided by the first location server 415. The second location reference may be a second location URI, for example, which includes the first location URI as embedded information. Because the second location reference includes all of the information needed to identify the first location server 415 and the target device 411, the second location URI is stateless. In other words, the second location server 425 does not need to maintain state or otherwise store data for identifying the first location server 415 and the target device 411, or for identifying the relationships among the first location server 415, the target device 411 and/or the first location reference, or for identifying user information.

In various embodiments, the first location reference and/or information that the second location server 425 uses in serving the second location reference may be encrypted in the second location reference using a predetermined encryption technique and key, known by at least the second location server 425. To prevent large location references being minted, relatively weak ciphers may be used to encrypt the embedded first location reference in the second location reference and/or to encrypt the embedded identification information in the first location reference. To prevent embedded information being leaked, a key replacement scheme may be used. For example, an unencrypted short identifier for selecting an encryption key may be included outside the encrypted portion of the second location reference and/or the first location reference. Notably, a key replacement period, plus the maximum possible lifetime of a location, should be significantly shorter than the time that it is expected to take to break the selected cipher. Accordingly, the cipher, the key replacement period and the location reference lifetime are selected together.

Any of various types of encryption may be implemented without departing from the scope of the present teachings. One example includes using a 128 bit variant of Advanced Encryption Standard (AES), along with a 32-bit cyclic redundancy check (CRC), enclosed in the encrypted portion of the location reference (e.g., token or location URI) to ensure that the contents cannot be altered. Use of the CRC prevents an attacker from tampering with the contents of the location resource, which may be otherwise possible even when the contents are encrypted. The key identifier may be sent in the clear, as discussed above, to allow keys to be rotated and the cipher to be changed. An illustrative structure may appear as follows:

```
AES {
    Identification information (IP address, MAC, location URI, etc.)
    Other state (timestamps, etc.)
    CRC for other encrypted data
}
```

The second location server 425 sends the second location reference to the first location server 415 in step 403. The first location server 415 then returns the second location reference to the target device 411 in step 404, satisfying the initial request for a location reference sent by the target device 411 in step 401.

In various embodiments, the first location reference may include an expiration time, e.g., as part of the policy information, although the expiration time is not necessarily provided to the second location server 425. Likewise, the second location reference may include a separate expiration time, e.g., as part of policy information enforceable by the second location server 425, as discussed below. This prevents the first location server 415 from gaining an indefinitely valid second location reference. Thus, there may be two separate expiration times, separately enforced by the first location server 415 and the second location server 425. Alternatively, in an embodiment, the first location server 415 may mint the first location reference with a first expiration time, and request the second location reference from the second location server 425 using the first location reference as input, as discussed above. The second location server 425 provides the second location reference with a second expiration time. The first location server 415 then provides the target device 411 with the second location reference with an expiration time set to the lesser of the first and second expiration times.

After receiving the second location reference from the first location server 415, the target device 411 conveys the second location reference to the application server 435 in step 405. For example, the target device 411 may send the second location reference in reply to a request for the location reference by the application 434. Alternatively, the target device 411 may automatically provide the second location reference to the application 434 upon initiating the corresponding location based service.

In step 406, the application 434 requests the location of the target device 411 from the second location server 425 using the second location reference (which identifies the second location server 425) provided by the target device 411. As stated above, application 434 considers the location service implemented by the second location server 425 a trusted service. The second location server 425 receives the request from the application server 435, and extracts the first location reference, along with other data, from the second location reference. When the first location reference is encrypted, the second location server 425 first decrypts the extracted first location reference using the appropriate key, as would be apparent to one of ordinary skill in the art. The second location server 425 is able to identify the first location server 415 using the extracted (and decrypted) first location reference.

In various alternative embodiments (not shown), the second location reference may likewise include user references associated with the target device 411, as discussed above with respect to the first location reference, or the second location server 425 may otherwise be able to access the user information identified or referenced by the first location reference. The user references may identify or refer to user information stored on the authorization policy server 422 and/or the device capability server 423, or user information stored on other data sources (not shown), e.g., for storing policy information and device capability information, respectively. This would enable the second location server 425 to independently enforce policy and/or independently determine the location of the target device 411 using device capabilities, when needed, in substantially the same manner discussed above with respect to the first location server 415. In addition, the second location reference (or the referenced policy information) may include another expiration time and additional state information, for example, without departing from the scope of the present teachings.

In step 407, the second location server 425 makes a request to the first location server 415 using the extracted first location reference (or information extracted from the second location reference), querying the location of the target device 411. Notably, the second location server 425 may be servicing location servers (e.g., asserting LISs) from enterprise networks in addition to the first network 410.

The first location server 415 receives the location request from the second location server 425, decrypts the location reference, if necessary, and uses the first location reference to identify the target device 411, e.g., from among multiple mobile devices operating within the first network 410. The first location server 415 also extracts the user references for accessing all or a portion of the user information from the predetermined portion of the location reference, as well as any basic user information (e.g., basic policy and/or basic device capability information) that may be included in the first location reference. The location server 415 uses the user references to obtain the user information and/or to revise or supplement basic user information included in the location reference. The location server 415 retrieves a complete and/or revised set of policy information from the policy server 422 in step 407*a* and retrieves a complete and/or revised set of device capability information from the device capability server 423 in step 407*b*. The policy information and the device capability information are substantially the same as discussed above with reference to FIG. 1.

The first location server 415 then determines the location of the identified target device 411 by performing a location determination algorithm, discussed above, using the various policy and device capability information retrieved from the authorization policy server 422 and device capability server 423, respectively. For example, the location server 415 may confirm that the second location sever 425 and/or the application 434 is permitted to retrieve the location of the target device 411 using the policy information, and may select a particular location determination algorithm based on the device capability information, as discussed above. The location of the target device 411 determined by the first location server 415 is provided to the second location server 425 in step 408.

The second location server 425 then provides the determined location of the target device 411 to the application server 435 in step 409, which uses the determined location to complete execution of the application 434. In various embodiments, the second location server 425 may first validate the location of the target device 411 before sending the location on to the application server 435, as discussed further with reference to FIG. 6, below. When the second location server 425 is unable to validate the location, it may separately determine the location of the identified target device 411 by performing its associated location determination algorithm, which is then provided to the application server 435 in step 409.

FIG. 4 depicts an illustrative embodiment in which a stateless location determination process is performed using tandem trust relationships. However, various alternative embodiments provide a stateful location determination process, at least with respect to the device identification information of the target device 411. For example, a location reference is provided having at least the three properties discussed above. The location reference may be a location URI, although any type of location reference or other identifying information having these properties may be incorporated, without departing from the scope of the present teachings. That is, the location reference need only provide enough information for the second server 425 to identify the first server 415, and a token that can be passed between the first server 415 and the second server 425 for the purpose of identifying the target device 411. For example, any minted token capable of identifying the source entity may be used. A digital signature over a nonce that identifies the target device 411 would likewise work, since the digital signature needs to include an indicator of who signed it, which in turn leads back to the signing party (e.g., the first server 415).

Figure 5:
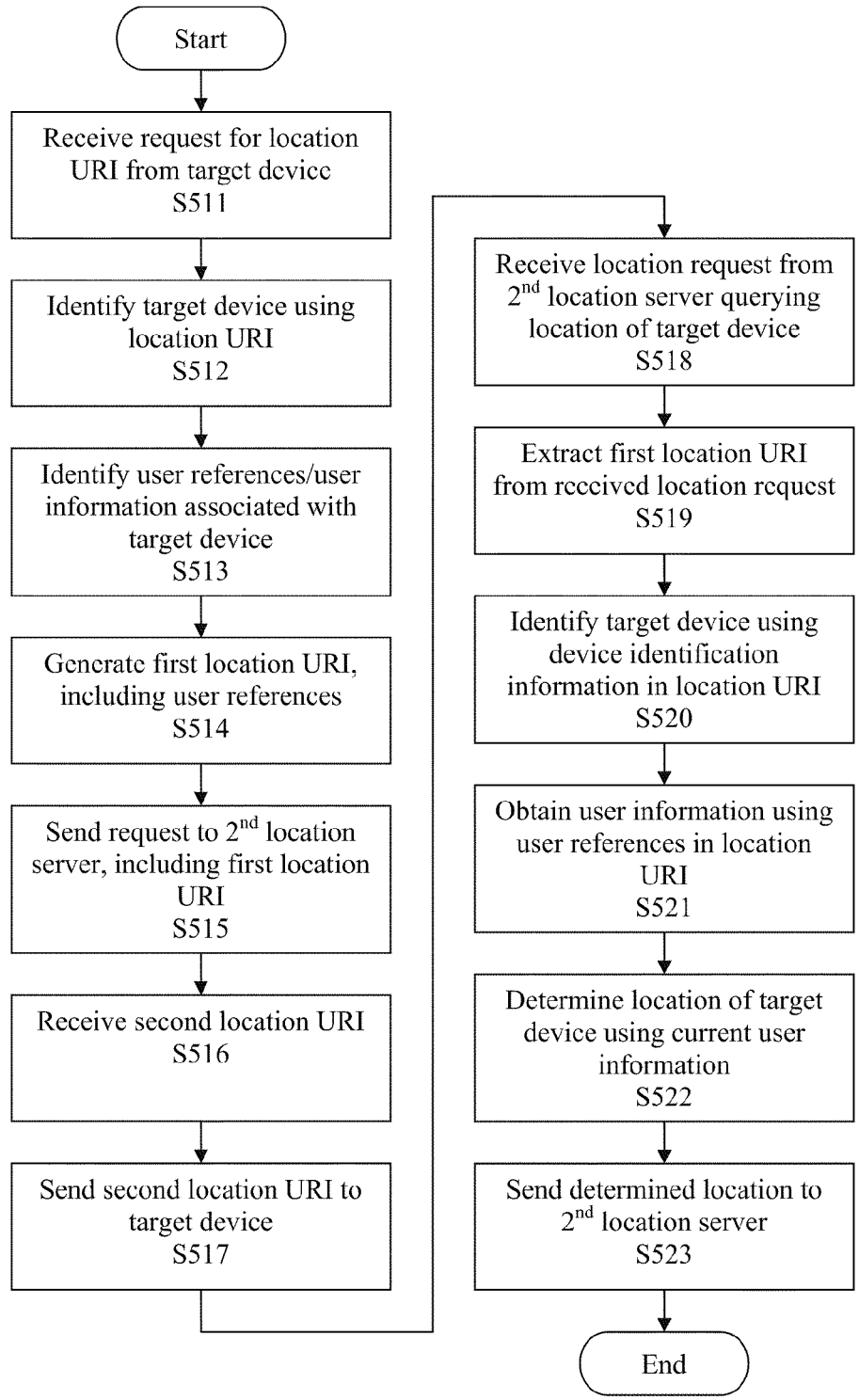
FIG. 5 is a flowchart illustrating a method implemented by a location server in a first network for locating target devices using stateless or minimal state user information, according to a representative embodiment.
Figure 6:
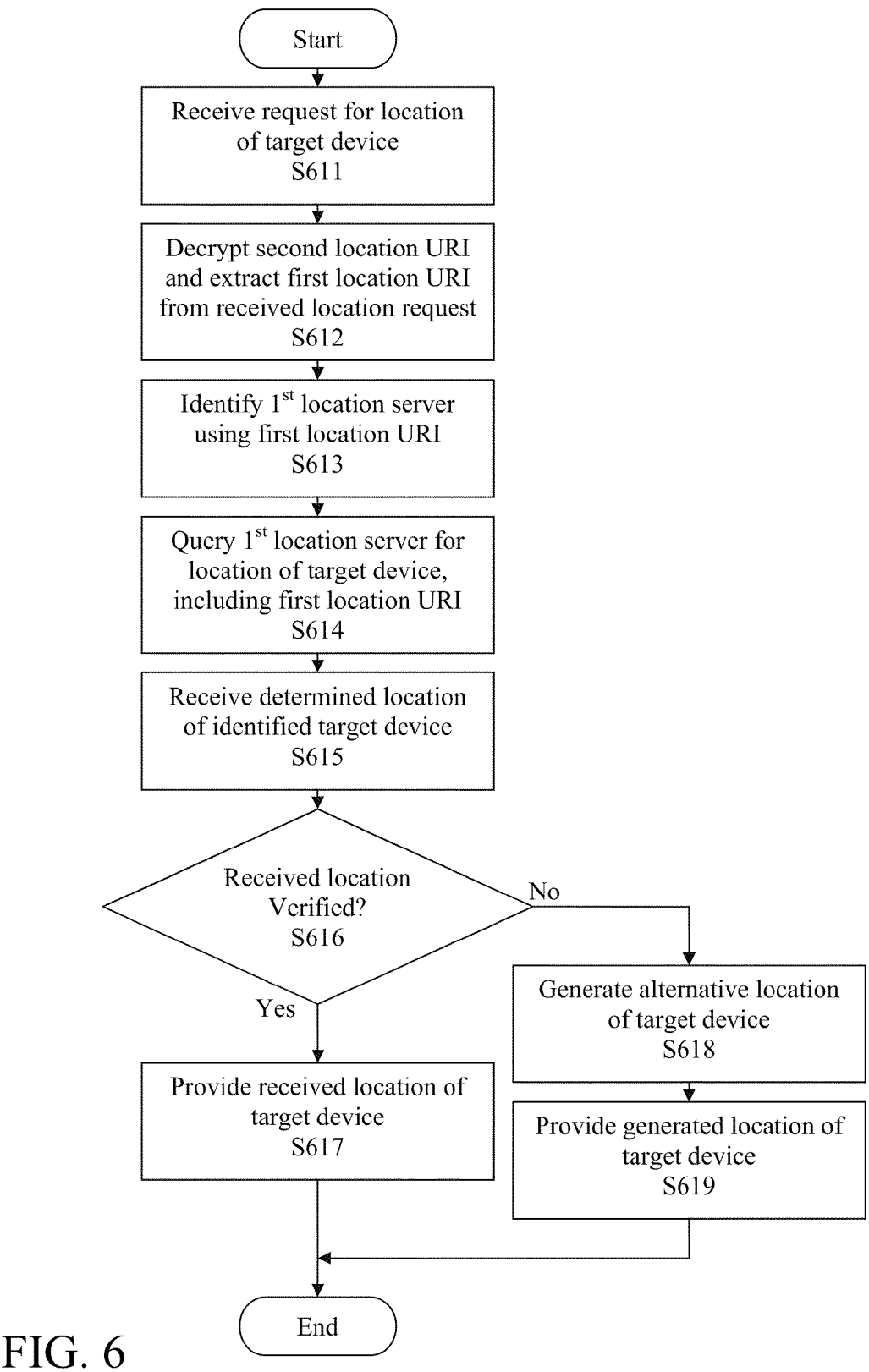
FIG. 6 is a flowchart illustrating a method implemented by a location server in a second network for locating target devices in the first network using stateless or minimal state user information, according to a representative embodiment.

The stateless location determination process using tandem trust relationships discussed above with reference to FIG. 4 may be implemented according to complementary algorithms executable by the first and second location servers 415 and 425, respectively. For example, FIG. 5 is a flowchart illustrating a method implemented by the first location server 415 in the first network 410 for locating the target device 411, and FIG. 6 is a flowchart illustrating a method implemented by the second location server 425 in the second network 420 for locating the target device 411, according to representative embodiments including stateless or minimal state implementation. For purposes of description, the first and second location references are assumed to be location URIs, although various other types of location reference may be incorporated, as discussed above.

Referring to FIG. 5, the first location server 415, e.g., the asserting LIS, receives a request for a location URI from the target device 411 in block S411, where the target device 411 is operating within the first network 410. The target device 411 has a MAC address and has been allocated a dynamic IP address in the first network 410. The request is received through the first network 410, which may be any type of wired or wireless IP network in the present example.

In response, the first location server 415 identifies the target device 411 in block S512 using device identification information included in the request for the location URI, such as an ESN, an IP address, a MAC address or the like, as discussed above. In block S513, the location server 415 identifies the user references associated with the target device 41111, as well as user information and/or data sources, such as the authorization policy server 422 and the device capability server 423, which contain all or a portion of the user information and to which the user references refer, as discussed above.

The first location server 415 then generates or otherwise obtains a first location URI in block S514. The first location URI includes the user references and, depending on the embodiment, all or a portion of the user information, as discussed above. In addition, the first location URI includes sufficient information to enable a location server in another domain (e.g., the second location server 425) to identify the first location server 415 and to enable the first location server 415 subsequently to identify the target device 411. For example, the first location server 415 may identify the IP address of the target device 411 from the request received in block S511, and determine the MAC address of the target device 411 based on the IP address using any of a variety of determination techniques, as would be apparent to one of ordinary skill in the art. The first location server 415 may include the IP address and/or MAC address of the target device in the first location URI, as well as the domain name and/or IP address of the first location server 415, the protocol to be used to contact the first location server 415, and any other information required by the protocol (e.g., TCP port, etc.). However, various other information for identifying the first location server 415 and/or the target device 411 may be included without departing from the scope of the present teachings. Also, in various embodiments, the information included in the first location URI may be encrypted.

The first location server 415 sends a request for a location URI to the second location server 425, e.g., the validating LIS, in block S515, where the request includes the first location URI. For example, the first location URI may be included in the request to the second location server 425 by populating the <uri> parameter described by Winterbottom et al. in Internet-Draft, "Use of Device Identity in HTTP-Enabled Location Delivery (HELD), draft-ietf-geopriv-held-identity-extensions-04 (Jun. 21, 2010) (hereinafter, "HELD Draft"), the contents of which are hereby incorporated by reference. More particularly, the HELD Draft provides the following example of a request for location information, including the <uri> parameter, that refers to a single device:

```
<device xmlns="urn:ietf:params:xml:ns:geopriv:held:id">
    <uri>sip:user@example.net;gr=kjh29x97us97d</uri>
</device>
```

The first location server 415 and the second location server 425 must have a common understanding of the semantics implied by use of the first location URI. Of course, other techniques for including the first location URI and/or identification information embedded in the first location URI in the request may be incorporated without departing from the scope of the present teachings.

In block S516, the first location server 415 receives a second location URI from the second location server 425 in response to the request. The second location URI includes the first location URI as embedded information. For example, the second location URI includes a path or query component containing embedded information, including the first location URI, which the second location server 425 uses in serving the second location URI. The embedded information may be encrypted, and thus included in an encrypted portion or encrypted string of the path or query component in the second location URI. In an embodiment, the second location server 425 knows the identity of all likely asserting location server (e.g., including the first location server 415) instances, and thus assigns each an identifier. The assigned identifier can be included in the encrypted portion of the second location URI generated by the second location server 425 to identify the first location server 415, e.g., in place of the scheme, host and port portions of the second location URI, thus reducing the amount of data that needs to be encrypted.

The first location server 415 then returns the second location URI to the target device 411 in block S517. In an embodiment, the first location server 415 takes no further action with respect to the first or second location URIs and/or determining the location of the target device 411 at this time. Meanwhile, the target device 411 conveys the second location URI to the application server 435, e.g., in reply to a request for a location URI by the application 434. The application server 435 sends second location URI to the (trusted) second location server 425 to request the location of the target device 411, as discussed above with reference to steps 405 and 406 of FIG. 4. The initial handling of the second location URI by the second location server 425 is discussed below with reference to blocks S611-S615 of FIG. 6.

Eventually, at block S518, the first location server 415 receives a location request from the second location server 425 querying the location of the target device 411. The location request includes the first location URI previously generated by the location server 415 in block S514, which was provided to the second location server 425 by the application server 435 in response to a requirement for the location of the target device 411. The first location server 415 extracts the first location URI in block S519 and decrypts the first location URI (if necessary) to obtain the embedded identification information in order to identify the target device 411 in block S520.

In addition, the first location server 415 obtains user information corresponding to the target device 411 in block S521 using the one or more user references in the extracted location URI that refer to associated data sources, such as the authorization policy server 422 and the device capability server 423. In various embodiments, the user references may identify or refer to user information including complete sets of the most recent user information stored in the data sources and/or documents stored in the data sources indicating only revisions to the user information, as discussed above. For example, if the location URI already includes basic policy information and basic device capability information, the location server 415 will supplement and/or update this user information using either the complete sets of policy information and device capability information retrieved from the authorization policy server 422 and the device capability server 423, respectively, or using the revisions indicated by the documents retrieved from the authorization policy server 422 and the device capability server 423, respectively. If the location URI does not include any policy information or device capability information, the location server 415 will retrieve the complete sets of policy information and device capability information from the authorization policy server 422 and the device capability server 423, respectively, using the corresponding user references.

The location server 415 determines the location of the target device 411 in block S522 using the user information obtained in block S521. For example, the first location server 415 performs a location determination algorithm, e.g., using wiremap, packet tracing and/or other techniques, which may be selected, in part, based on the device capabilities identified in the user information, as discussed above. The calculated location of the target device 411 is returned to the second location server 425 in block S523.

As mentioned above, FIG. 6 is a flowchart illustrating a method implemented by the second first location server 425 in the second network 420 for locating the target device 411, according to representative embodiments including stateless implementation. Referring to FIG. 6, the second location server 425, e.g., the validating LIS, receives a request for the location of the target device 411 from the application server 435 in block S611. More particularly, the application 434 makes a request including the second location URI received from the target device 411, where the second location URI identifies the second location server 424.

In block S612, the second location server 425 decrypts (if necessary) the encrypted string or data of the path or query component in the second location URI, extracting the first location URI along with other embedded information. For example, in order to decrypt the encrypted data, the second location server 425 may extract an unencrypted short identifier that identifies an encryption key from the second location URI, extract an encrypted sequence from the second location URI, and decrypt the encrypted sequence using the extracted encryption key to obtain decrypted data. A checksum or hash of the decrypted data may be validated to check for modification of the second location URI. The first location URI is extracted from the decrypted data. The second location server 425 identifies the first location server 415 in block S613 using the extracted first location URI, which refers to and otherwise identifies the first location server 415, as well as the target device 411. In block S614, the second location server 425 makes a request including the first location URI to the first location server 415 for the location of the target device 411.

After the first location server 425 has determined the location of the target 411, as discussed above with reference to blocks S518-S523, the second location server receives the determined location from the first location server 415 in block S615. The second location server 425 then verifies the received location of the target device 411 in block S616 in order to confirm its accuracy. For example, the second location server 425 may confirm that the received location is in the geographic domain of the first location server 415, e.g., by comparing the received location with previously stored known boundaries of the first network 410 or by comparing the received location with a location determined independently by the second location server 425. When the determined location of the target device 411 falls outside the known boundaries, it may be assumed that the determined location is invalid.

When the received location of the target device 411 is verified (block S616: Yes), the second location server 425 provides the received location to the application server 435 at block S617, enabling the application 434 to proceed with execution of the corresponding location service. When the received location of the target device 411 is not verified (block S616: No), the second location server 425 generates an alternative location of the target device 411 using its own location determination processes in block S618 and provides the alternative location to the application server 435 at block S619. For example, when the target device 411 is no longer within the first network 410, or the first location server 415 is otherwise unable to provide a reasonably accurate location determination, the second location server 425 is still able to provide a location to the application server 435, even though it may not be as precise as what an accurate determination by the first location server 415 would otherwise produce. In an embodiment, the second location server 425 may determine the location of the target device 411 while waiting for the location as determined by the first location server 415, to decrease time delay in case the second location server 425 is unable to verify the validity of the location determined by the first location server 415 in block S619. In the event the second location server 425 is unable to verify the validity, an error message may be sent to the application server 435 notifying the application 434 of the inability to obtain the location of the target device 411.

Generally, according to various embodiments, a first LIS generates a first location URI including embedded device identification information for a target device residing in a network of the first LIS, as well as embedded user references referring to one or more data sources for providing complete and/or revised user information. The first location URI may also include all or a portion of the user information (e.g., without revisions). The first LIS provides the first location URI to a second LIS, which embeds the first location URI in an encrypted portion of a second location URI, generated by the second LIS. The second LIS provides the second location URI to the first LIS, which provides the second location URI to the target device. The second LIS stores no information, and otherwise does not maintain state, in regard to the first or second location URIs, the first LIS, the identification of the target device, the user references and/or the user information.

Subsequently, the second LIS receives the second location URI from a location based service application seeking the location of the target device, and extracts and decrypts the first location URI from the second location URI. The second LIS requests the location of the target device by sending the first location URI to the first LIS, which is identified by the extracted first location URI. The first LIS identifies the target device and user references, as well as embedded basic user information (if any), using the first location URI, and retrieves the complete and/or revised user information based on the user references. The first LIS determines the location of the target device, based in part on the user information, and returns the determined location of the target device to the second LIS. The second LIS may validate that the location returned by the first LIS falls within the geographic domain serviced by the first LIS. The second LIS may also provide an alternative location if the location returned by the first LIS does not fall within the geographic domain serviced by the first LIS.

Figure 7:
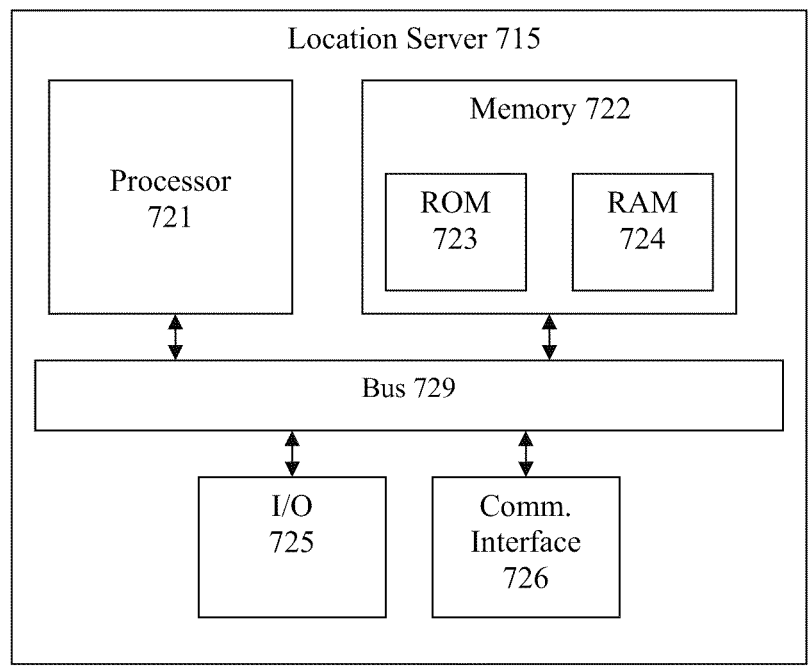
FIG. 7 is a functional block diagram showing an illustrative location server for locating a target device, according to a representative embodiment.

FIG. 7 is a functional block diagram showing an illustrative server 715, such as the first location severs 115, 415 or second location servers 125, 425, that executes all or a portion of a process for determining the location of a target device, according to a representative embodiment. Although the server 715 is shown and discussed in detail, it is understood that other servers in the telecommunication system 100 and/or the target device 111 of FIG. 1 or in the telecommunication system 400 and/or the target device 411 of FIG. 4 may be configured in a similar manner as the server 715, at least with respect to processing and storage functionality.

The various "parts" shown in the server 715 may be physically implemented using a software-controlled microprocessor, e.g., processor 721, hard-wired logic circuits, firmware, or a combination thereof. Also, while the parts are functionally segregated in the server 715 for explanation purposes, they may be combined variously in any physical implementation.

In the depicted embodiment, the server 715 includes processor 721, memory 722, bus 729 and various interfaces 725-726. The processor 721 is configured to execute one or more logical or mathematical algorithms, including the location determination process of the embodiments described herein, in conjunction with the memory 722, as well as basic functionality for executing and/or controlling location determination processes for locating target devices. The processor 721 may be constructed of any combination of hardware, firmware or software architectures, and include its own memory (e.g., nonvolatile memory) for storing executable software/firmware executable code that allows it to perform the various functions. Alternatively, the executable code may be stored in designated memory locations within memory 722, discussed below. In an embodiment, the processor 721 may be a central processing unit (CPU), for example, executing an operating system, such as Windows operating systems available from Microsoft Corporation, NetWare operating system available from Novell, Inc., or Unix operating system available from Sun Microsystems, Inc. The operating system controls execution of other programs of the location server 715.

The memory 722 may be any number, type and combination of nonvolatile read only memory (ROM) 723 and volatile random access memory (RAM) 724, and stores various types of information, such as computer programs and software algorithms executable by the processor 721 (and/or other components), e.g., to perform location determination processes of the embodiments described herein. As generally indicated by ROM 723 and RAM 724, the memory 722 may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like. Further, the memory 722 may store the predetermined boundaries one or more enterprise networks, as discussed above.

Further, as discussed above, messages are received from various other components (e.g., location servers 115, 415, 425, target devices 111, 411, application servers 135, 435) through communication interface 726, and communicated to the processor 721 and/or the memory 722 via bus 729. The type, number and arrangement of the network interfaces may vary without departing from the scope of the present teachings.

In an embodiment, a user and/or other computers may interact with the server 715 using various input device(s) through I/O interface 725. The input devices may include a keyboard, key pad, a track ball, a mouse, a touch pad or touch-sensitive display, and the like. Also, various information may be displayed on a display through a display interface (not shown), which may include any type of graphical user interface (GUI).

In various embodiments, the process steps depicted FIGS. 2-3 and 5-6 may be incorporated within one or more processing modules of a device, such as the location servers 115, 415 and/or 425, respectively. However, the modules may be executable by any other server, computer or node programmable to determine all or a portion of the location determination process according to the various embodiments, without departing from the scope of the present teachings. The modules may be implemented as any combination of software, hard-wired logic circuits and/or firmware configured to perform the designated operations. Software modules, in particular, may include source code written in any of a variety of computing languages, such as C++, C# or Java, and are stored on tangible computer readable storage media, such the computer readable storage media discussed above with respect to memory 722, for example.

The identity and functionality of the modules may vary, without departing from the scope of the present teachings. For example, referring to FIG. 2, blocks S212-S214 may be incorporated within a location URI generation module, and blocks S211 and S215 may be incorporated within a target device communication module. Also, for example, referring to FIG. 3, blocks S311 and S316 may be incorporated within a server communication module, blocks S312-S314 may be incorporated within a user information determination module, and block S315 may be incorporated within a target device location determination module. Of course, the number and/or identities of the modules, as well as the combinations of steps included in each, may vary without departing from the scope of the present teachings.

Similarly, referring to FIG. 5, blocks S511 and S517 may be incorporated within a target device communication module, blocks S512-S514 may be incorporated within a first location URI generation module, blocks S515, S516, S518 and S523 may be incorporated within a server communication module, blocks S519-S521 may be incorporated within a user information determination module, and block S522 may be incorporated within a target device location determination module. Also, for example, referring to FIG. 6, block S611 may be incorporated within an application interface module, blocks S612 and S613 may be incorporated within a location URI extraction module, blocks S614 and S615 may be incorporated within a server communication module, and blocks S616 to S619 may be incorporated within a target device location verification module. Of course, the number and/or identities of the modules, as well as the combinations of steps included in each, may vary without departing from the scope of the present teachings.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method of providing a location of a target device to an application implementing a location based service, the method comprising:
receiving a request for a location reference from the target device at a first location server;
identifying at least one data source in response to the request;
generating the location reference to include the identification of the at least one data source;
providing the location reference to the target device, the target device providing the location reference to the application,
subsequently receiving a request for a location of the target device from the application at the first location server, the request including the location reference previously generated by the first location server, the location reference comprising a user reference referring to user information corresponding to the target device and stored in the at least one data source;
retrieving the user information from the at least one data source using the user reference extracted from the location reference;
determining the location of the target device based at least in part on the retrieved user information; and
providing the determined location of the target device to the application.

2. The method of claim 1, wherein the location reference comprises a uniform resource identifier (URI).

3. The method of claim 2, wherein the user reference comprises a URI.

4. The method of claim 1, wherein the user information comprises authorization policy information.

5. The method of claim 4, wherein determining the location of the target device based at least in part on the user information comprises determining that the application is authorized to receive the location of the target device based on the authorization policy information.

6. The method of claim 1, wherein the user information comprises device capability information.

7. The method of claim 6, wherein determining the location of the target device based at least in part on the user information comprises identifying a capability of the target device using the device capability information and selecting a location determination process for determining the location of the target device based on the identified capability.

8. The method of claim 1, wherein retrieving the user information comprises retrieving a document from the at least one data source, the document comprising a revision to previous user information.

9. The method of claim 8, wherein the document comprises an extensible markup language (XML) formatted document.

10. The method of claim 1, wherein the location reference further comprises basic user information, the user information referred to by the user reference comprising a revision to the basic user information.

11. The method of claim 10, wherein the revision to the basic user information is in a document stored in at least one data source.

12. The method of claim 1, wherein the location reference further comprises device identification information enabling identification of the target device.

13. A method of providing a location of a target device, the method comprising:
receiving a first location uniform resource indicator (URI) request from the target device at a first location information server (LIS);
generating a first location URI at the first LIS in response to the first request, the first location URI comprising device identification information identifying the target device and a user reference referring to user information corresponding to the target device and stored in at least one data source;
including the first location URI in a second location URI request from the first LIS to a second LIS, the second LIS generating a stateless second location URI in response to the second request, the first location URI being embedded in the second location URI;

receiving the second location URI from the second LIS at the first LIS;

providing the second location URI from the first LIS to the target device to be provided to an application requesting location information of the target device from the second LIS;

subsequently receiving a query at the first LIS from the second LIS requesting the location of the target device, the query including the first location URI;

identifying the target device at the first LIS using the device identification information in the first location URI;

retrieving the user information from the at least one data source using the user reference in the first location URI;

determining the location of the target device based at least in part on the retrieved user information; and providing the determined location of the target device from the first LIS to the second LIS, which provides the determined location to the application.

14. The method of claim 13, wherein the user information comprises authorization policy information.

15. The method of claim 14, wherein determining the location of the target device based at least in part on the retrieved user information comprises determining that the application is authorized to receive the location of the target device based on the authorization policy information.

16. The method of claim 13, wherein the user information comprises device capability information.

17. The method of claim 16, wherein determining the location of the target device based at least in part on the retrieved user information comprises identifying a capability of the target device using the device capability information and selecting a location determination process for determining the location of the target device based on the identified capability.

18. The method of claim 13, wherein retrieving the user information comprises retrieving a document from the at least one data source, the document comprising a revision to previous user information.

19. The method of claim 18, wherein the document comprises an extensible markup language (XML) formatted document.

20. The method of claim 13, wherein there is a preexisting trust relationship between the application the second LIS, and no preexisting trust relationship between the application and the first LIS.

* * * * *